United States Patent
Vu Duong et al.

(12)

(10) Patent No.: US 9,560,135 B2
(45) Date of Patent: Jan. 31, 2017

(54) TECHNIQUE FOR COMMUNICATION BETWEEN NETWORKS FOR DISTRIBUTING DIGITAL CONTENTS

(75) Inventors: Thang Vu Duong, London (GB); Frédéric Fieau, Paris (FR); Gaël Fromentoux, Pleumeur Bodou (FR)

(73) Assignee: Orange, Paris (FR)

( * ) Notice: Subject to any disclaimer, the term of this patent is extended or adjusted under 35 U.S.C. 154(b) by 344 days.

(21) Appl. No.: 14/110,662

(22) PCT Filed: Apr. 10, 2012

(86) PCT No.: PCT/FR2012/050773
§ 371 (c)(1),
(2), (4) Date: Dec. 26, 2013

(87) PCT Pub. No.: WO2012/136945
PCT Pub. Date: Oct. 11, 2012

(65) Prior Publication Data
US 2014/0108609 A1 Apr. 17, 2014

(30) Foreign Application Priority Data
Apr. 8, 2011 (FR) ...................................... 11 53096

(51) Int. Cl.
*H04L 29/08* (2006.01)
*H04L 12/721* (2013.01)

(52) U.S. Cl.
CPC .......... *H04L 67/1097* (2013.01); *H04L 45/12* (2013.01); *H04L 67/06* (2013.01); *H04L 67/288* (2013.01);
(Continued)

(58) Field of Classification Search
CPC ............. H04L 67/1097; H04L 67/2814; H04L 67/327; H04L 67/288; H04L 67/289; H04L 45/12; H04L 67/06
See application file for complete search history.

(56) References Cited

U.S. PATENT DOCUMENTS

| 7,257,628 B2 | 8/2007 | Liskov et al. |
| 7,260,598 B1 | 8/2007 | Liskov et al. |

(Continued)

FOREIGN PATENT DOCUMENTS

| WO | 02071242 A1 | 9/2002 |
| WO | 03039105 A1 | 5/2003 |
| WO | 03069437 A2 | 8/2003 |

OTHER PUBLICATIONS

Bertrand et al., "Content Distribution Network Interconnection Experiments", Internet Engineering Task Force, Feb. 16, 2011.
(Continued)

*Primary Examiner* — Chris Parry
*Assistant Examiner* — Stephen Houlihan
(74) *Attorney, Agent, or Firm* — David D. Brush; Westman Champlin & Koehler, P.A.

(57) ABSTRACT

A method is provided for communication, which is implemented by an interfacing device of a server of a first network for distributing digital content. The method includes: receiving a content ingestion request emitted by a device of a second network for distributing content, with a view to storage of the content in the second distribution network; and when the first distribution network is not able to respond to the request, dispatching an enquiry destined for at least one third network for distributing content, requesting a transfer of the content to the second distribution network. The first distribution network delegates the transfer of the content. The third distribution network then transfers the digital content to the second content distribution network.

12 Claims, 2 Drawing Sheets

(52) U.S. Cl.
CPC ......... *H04L 67/289* (2013.01); *H04L 67/2814* (2013.01); *H04L 67/327* (2013.01)

(56) References Cited

U.S. PATENT DOCUMENTS

| | | | |
|---|---|---|---|
| 7,289,519 B1* | 10/2007 | Liskov | H04L 29/12066 370/230 |
| 2002/0116444 A1* | 8/2002 | Chaudhri | H04L 67/42 709/201 |
| 2003/0115283 A1 | 6/2003 | Barbir et al. | |
| 2003/0174648 A1* | 9/2003 | Wang | H04L 65/1013 370/235 |
| 2005/0010653 A1* | 1/2005 | McCanne | H04L 69/329 709/219 |
| 2007/0180468 A1 | 8/2007 | Gill et al. | |
| 2012/0240176 A1* | 9/2012 | Ma | H04N 21/23439 725/114 |

OTHER PUBLICATIONS

English translation of the International Written Opinion dated Oct. 8, 2013 for corresponding International Application No. PCT/FR2012/050773, filed Apr. 10, 2012.

Pathan M. et al., "Resource Discovery and Request-Redirection for Dynamic Load Sharing in Multi-Provider Peering Content Delivery Networks", Journal of Network and Computer Applications, Academic Press, New York, NY, US, vol. 32, No. 5, Sep. 1, 2009 (Sep. 1, 2009), pp. 976-990, XP026266877.

Pathan et al., "A Utility Model for Peering of Multi-Provider Content Delivery Services", Local Computer Networks, 2009, LCN 2009, IEEE 34th Conference on, IEEE, Piscataway, NJ, USA, Oct. 20, 2009 (Oct. 20, 2009), pp. 475-482, XP031581486.

International Search Report and Written Opinion dated Jun. 29, 2012 for corresponding International Application No. PCT/FR2012/050773, filed Apr. 10, 2012.

* cited by examiner

TECHNIQUE FOR COMMUNICATION BETWEEN NETWORKS FOR DISTRIBUTING DIGITAL CONTENTS

CROSS-REFERENCE TO RELATED APPLICATIONS

This Application is a Section 371 National Stage Application of International Application No. PCT/FR2012/050773, filed Apr. 10, 2012, which is incorporated by reference in its entirety and published as WO 2012/136945 on Oct. 11, 2012, not in English.

FIELD OF THE DISCLOSURE

The present disclosure relates to a method and device for distributing digital content in a Content Delivery Network.

BACKGROUND OF THE DISCLOSURE

A "Content Delivery Network" (CDN) is made up of different devices connected via a communication network. These devices interwork in order to make contents available to client entities. Some of these devices, referred to as content delivery servers, are responsible for the actual delivery of the contents to the client entities. These content delivery servers are generally distributed in the communication network in order to optimize delivery costs. In a distribution network of this type, a request from a client entity is routed according to different criteria toward one of the devices responsible for the delivery.

A distribution network of this type may be associated with a specific access type, for example mobile or fixed, or with a specific network operator.

A need exists to interconnect content distribution networks.

The working document of the "Internet Engineering Task force" (IETF), referenced "draft-bertrand-cdni-experiments-00" and entitled "Content Distribution Network Interconnection Experiments", presents test results relating to interconnection between two content distribution networks. More precisely, a usage case is presented, based on messages conforming to the "HyperText Transfer Protocol" (HTTP), in which, on reception by a first content distribution network CDN A of a request transmitted by a client entity relating to a content C, which is not available to the first network CDN A, the first network CDN A requests the content C from a second distribution network CDN B and obtains it in return.

If the second network CDN-B does not have the content C, it is provided that it contacts the content provider CSP B in order to store this content in a cache memory.

No other mechanism is currently provided.

Moreover, content distribution network manufacturers do not offer an interface which allows the distribution networks to communicate with one another. Thus, it is not generally possible to enable simple communication between two content distribution networks.

SUMMARY

According to a first aspect, the subject-matter of the invention is a communication method carried out by an interfacing device of a server of a first digital content distribution network, said method comprising the following steps:

a step of receiving a content ingestion request transmitted by a device of a second content distribution network with a view to storing the content in the second distribution network;

if said first distribution network is not able to respond to the request, a step of dispatching a request to at least one third content distribution network, requesting a transfer of the content to the second distribution network, the first distribution network delegating said content transfer.

The term "digital content" is understood to mean any type of digital data corresponding to a content or a set of contents which can be transmitted in the network considered in the form of a data stream. This may notably involve data relating to a document, or image, sound or video data, or, in a general manner, multimedia data.

Thus, by means of the invention, it is possible to delegate to the third content distribution network the transfer or provision of content to the second distribution network. More precisely, this delegation is performed by a server of the third distribution network. The second content distribution network will thus be able to obtain the content from the third distribution network without a prompt on its part to the third distribution network. Moreover, this content transfer can be carried out without a peering agreement between the second and third distribution networks.

It is evident from the inventory drawn up in the IETF document cited above that the interconnection between the distribution networks is possible only with the intervention of a human operator and is limited to the interconnection between two distribution networks.

The communication method thus enables the implementation of an interface allowing the content distribution networks to communicate with one another, and notably to prompt other distribution networks to respond to a provision request or a content ingestion request to which the first distribution network cannot respond. The communication method also enables the implementation of an interworking between a plurality of distribution networks by means of the distribution of the content ingestion requests to other distribution networks. Moreover, the delegation mechanism allows the third distribution network to provide the content directly to the second distribution network.

The communication method also improves the quality of the content distribution service by increasing the probability of the content distribution network obtaining a content already requested by the client entities or likely to be requested by client entities due to its popularity.

According to one particular characteristic, the ingestion request transmitted by the device of the second distribution network is received via at least one fourth distribution network in the form of a request with delegation.

It is thus possible to concatenate the delegations to further increase the probability of the content distribution network obtaining a requested content.

According to another particular characteristic, the communication method furthermore comprises:

a step of receiving an agreement to transfer the content from the third distribution network;

a step of dispatching said agreement to the second distribution network.

The provision agreement thus follows the reverse path of that followed by the content supply request. This allows the second distribution network to be informed that the third distribution network has assumed responsibility for processing the provision request.

According to a different particular characteristic, if said first distribution network is able to respond to the request, the communication method furthermore comprises:

a step of determining a path linking the first distribution network to the second distribution network, if necessary via at least one fourth distribution network with which a peering is established;

a step of dispatching content to the second distribution network on said path, if necessary via said at least one fourth distribution network.

A path is understood to mean a list of devices or nodes belonging respectively to distribution networks and/or a list of devices or nodes in the underlying communication network.

Thus, the content will for its part follow a path independent from the path followed by the content provision request to reach the distribution network having requested the content.

According to a different particular characteristic, the communication method furthermore comprises a step of receiving information relating to said at least one fourth distribution network and in which said information is taken into account in order to determine a path.

Technical solutions exist which enable an optimum path to be determined in a distribution network. However, only criteria linked to the traffic in the communication network underlying the distribution network are taken into account. Moreover, these solutions are not transposable to the interconnection between the distribution networks. In fact, the interconnection requires the selection of distribution networks and/or devices belonging to said distribution networks.

The communication method thus allows each distribution network to take into account the information received from the different distribution networks in order to determine the optimum path.

The received information relates, for example, to the load of the devices of the distribution network.

More generally, each distribution network can define its own criteria which will be used in order to determine the optimum path.

According to a different particular characteristic, the communication method furthermore comprises:

a step of receiving said content and the associated path from the third distribution network to the second distribution network;

a step of dispatching the content to the second distribution network on said path via one of the distribution networks located on said path and with which a peering is established.

This allows the content to be transmitted in stages along the path and to the second distribution network.

According to a second aspect, the invention also relates to an interfacing device intended to be integrated into a first digital content distribution network, configured to interface with at least one second interfacing device of a second content distribution network, said device comprising:

reception means, configured to receive a content ingestion request transmitted by a device of a second content distribution network with a view to storing the content in the second distribution network;

dispatching means, configured to dispatch a request to at least one third content distribution network if said first distribution network is not able to respond to the request, requesting a transfer of the content to the second distribution network, the first distribution network delegating said transfer of said content.

According to one particular characteristic, the interfacing device furthermore comprises:

means for determining a path, configured to determine a path linking the first distribution network to the second distribution network, if necessary via at least one fourth distribution network with which a peering is established;

means for dispatching the content to the second distribution network on said path, if necessary via said at least one fourth distribution network.

According to a third aspect, the invention furthermore relates to a server of a content distribution network comprising at least one interfacing device, as previously described.

According to a fourth aspect, the invention furthermore relates to a content distribution system, comprising at least two interfacing devices as previously described, belonging respectively to two content distribution networks.

According to a fifth aspect, the invention relates to a program for an interfacing device of a content distribution network, comprising program code instructions intended to control the execution of the steps of the communication method previously described, if said program is executed by said device, and a recording medium readable by an interfacing device on which a program for an interfacing device is recorded.

BRIEF DESCRIPTION OF THE DRAWINGS

The invention will be better understood from a reading of the following description of particular embodiments of the method according to the invention, with reference to the attached drawings, in which.

DETAILED DESCRIPTION OF ILLUSTRATIVE EMBODIMENTS

Figure 1:
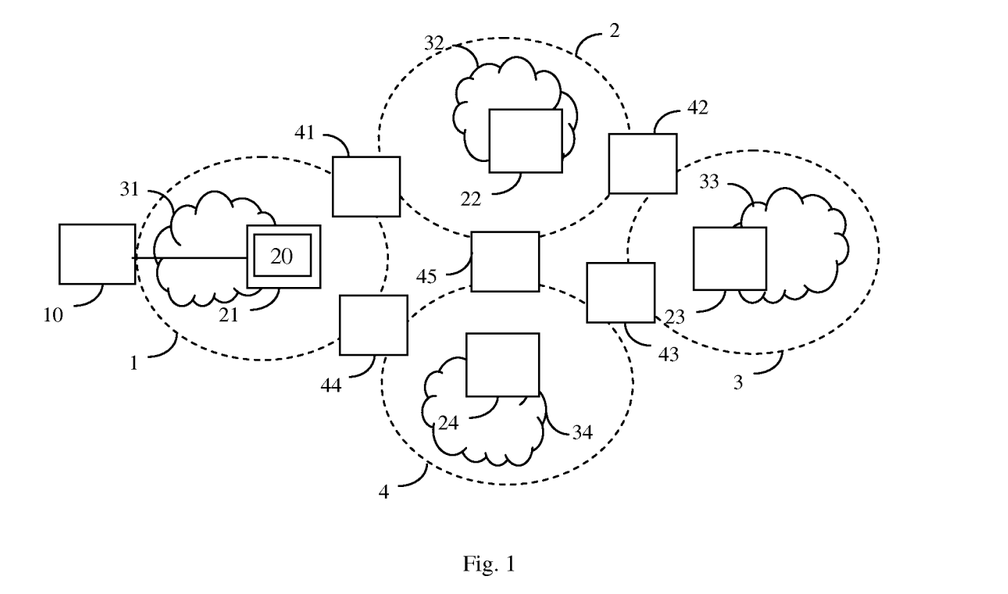
FIG. 1 shows a general architecture suitable for carrying out a method of communication between digital content distribution networks according to one embodiment of the present invention.

FIG. 1 shows a general architecture suitable for carrying out a method of communication between content distribution networks according to one embodiment of the present invention. Four stand-alone systems 1, 2, 3, 4 are shown in FIG. 1. As a general rule, such a stand-alone system 1-4 corresponds to a communication network and is under the control of an operator of this network. The first stand-alone system 1 comprises a first content distribution network 31, configured to receive requests for access to contents from client entities and to provide them in return with the requested content. A single client entity 10 is shown in FIG. 1. A plurality of client entities is obviously likely to request content. The first distribution network 31 comprises a service sub-network and a distribution sub-network. The service sub-network comprises servers, of which one 21 is shown in FIG. 1, these servers being suitable for receiving a digital content request from the client entity, for verifying if the requested digital content is available and for redirecting the client entity towards a content provision server of the distribution sub-network. The distribution sub-network comprises different content provision servers geographically distributed in the stand-alone system 1. For the sake of simplification, these servers are not shown in FIG. 1. The client entity 10 is suitable for requesting digital content from the service network and for receiving it from a content provision server of the distribution sub-network.

The second, third and fourth stand-alone systems are organized in a manner equivalent to that described in relation to the first stand-alone system. More precisely, the second stand-alone system 2 comprises a second content distribution network 32, for which a second server 22 of the service sub-network is shown in FIG. 1. The third stand-alone system 3 comprises a third content distribution network 33, for which a third server 23 of the service sub-network is shown in FIG. 1. The fourth stand-alone system 4 comprises a fourth content distribution network 34, for which a fourth server 24 of the service sub-network is shown in FIG. 1.

Data relating to the distribution networks are exchanged between the first 1 and second 2 stand-alone systems via a first peering device 41, or "peering point" in English, if the operators of these two stand-alone systems have established an agreement to connect their distribution networks. Peering agreements between the communication networks are obviously likely to exist elsewhere. The description below is restricted to peering between distribution networks. As shown in FIG. 1, the second 2 and third 3 stand-alone systems exchange data via a second peering device 42; the third 3 and fourth 4 stand-alone systems exchange data via a third peering device 43; the fourth 4 and first 1 stand-alone systems exchange data via a fourth peering device 44; the second 2 and fourth 4 stand-alone systems exchange data via a fifth peering device 45. No exchange of data relating to the distribution networks is provided between the first and third stand-alone systems.

It must be remembered here that the term "digital content" refers to any type of digital data corresponding to a content or a set of contents which can be transmitted in the network considered in the form of a data stream. This may notably involve data relating to a document, or image, sound or video data, or, in a general manner, multimedia data.

The term "digital content ingestion" is understood below to mean the first storage of this content in a content distribution network.

Figure 2:
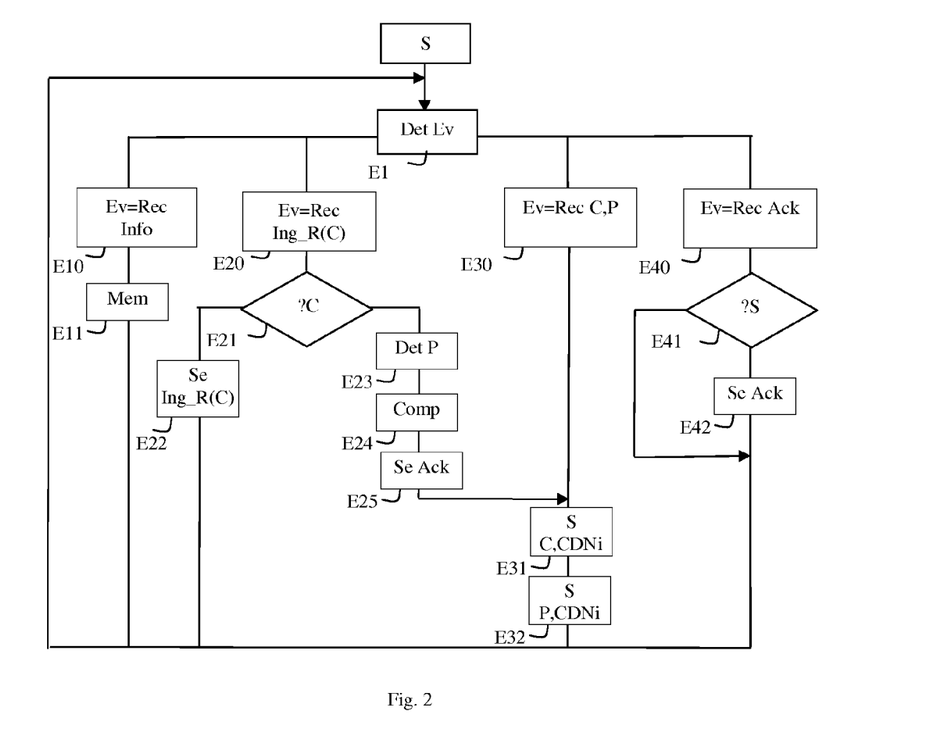
FIG. 2 shows the steps of the communication method according to a particular embodiment of the invention.

The communication method, as carried out by one of the servers 21, 22, 23, 24, will now be described in relation to FIG. 2. By way of a non-limiting example, the method is carried out in the second server 22 of the second distribution network 32. More precisely, an interfacing device 20 of the second server is responsible for carrying out the steps of the communication method.

In a first step E1, the second server 22 is on standby to detect an event.

In step E10, the second server 22 detects that information relating to one of the other distribution networks has been received. A peering agreement is established between the second distribution network 32 and this other distribution network. In the non-limiting example shown in FIG. 1, this other distribution network may correspond to the first 31, third 33 or fourth 34 distribution network.

More precisely, the received information may comprise:
  information relating to a load of this other distribution network;
  catalogues of contents available in this other distribution network, if necessary with information relating to a popularity of the content and/or content usage restriction rights;
  or information relating to a peering load of the peering device between the second content distribution network and this other distribution network.

In a step E11, the second server 22 stores the information received in association with an identifier of this other distribution network in a table 110.

In one particular embodiment, still during this step E11, the second server 22 determines a topology of all of the distribution networks and stores it in a topology table 112. Topology is understood to mean a mapping of the connections established between the different distribution networks. More precise information relating to a distribution network can also be stored in association. This involves, for example, addresses in the underlying communication network of entry points of the distribution network, such as servers, caches or distribution network controllers. It is emphasized here that these devices are not directly addressable by the client entities. It may also involve addresses in the underlying communication network of the peering devices or their respective states. It may also involve addresses in the underlying communication network of the distribution network devices for which the content provisions are destined. It is also possible to have different information levels between the different content distribution networks, for example according to the established peering agreements.

The method then returns to step E1 on standby to detect an event.

In step E20, the second server 22 detects that a request to provide a content C has been received from one of the other distribution networks. This provision request corresponds to a request for ingestion of the content C transmitted by one of the distribution networks. The ingestion request has possibly been relayed by a different distribution network in the form of a provision request or transfer request with delegation. This mode of operation of the method is described below in relation to step E22. The term provision request is used below to indicate either an ingestion request or a request with delegation.

In a step E21, consecutive to step E20, the second server 22 determines whether it is able to respond to this provision request. More precisely, it verifies whether the content is available in the second distribution network 32. Criteria such as the format of the data forming the content can also be taken into account during this step E21. Other criteria may also be taken into account, for example by identifying the contents in the manner described in the patent application published under the number U.S. 2007/0180468 A1 and entitled "Universal Digital Code For Unique Content Identification".

If the second distribution network is not able to respond to the content provision request, the second server 22 carries out a step of transferring E22 this request. The content provision request is transmitted to one or more of the other content distribution networks. This may involve a point-to-point dialogue with one of the other distribution networks or a distribution to all of the networks with which a peering is established. In one particular embodiment, the point-to-point dialogue may be initiated according to information stored in the table 112. In a different particular embodiment, the second server 22 may also take into account the content catalogues stored in the table 110 in association with the distribution network identifier in order to select one of the distribution networks which has the required content.

Information relating to delegation by the second distribution network 32 is also transmitted in association with the content provision request. This delegation allows one of the other distribution networks to provide the content to the distribution network having transmitted the initial provision request, i.e. the ingestion request. It is emphasized here that the request for provision of the content C may already contain a delegation of another distribution network, in the case where the request has already been relayed by this other distribution network. Thus, if the request for provision of the content C reaches a distribution network having the content, the latter is in fact the delegate of the first distribution network having relayed the request.

The method then returns to step E1 on standby to detect an event.

If it is verified in step E21 that the second distribution network 32 is able to respond to the request for provision of the content C, i.e. that the second network has the content C, the second server 22 determines, in steps E23 and E24, a path linking the second distribution network 32 to the distribution network requesting the ingestion of the content C, if necessary via a different distribution network.

In step E23, the second server 22 determines a set of potential paths between the two distribution networks concerned. A path corresponds to a list of devices or nodes belonging respectively to distribution networks and/or a list of devices or nodes in the underlying communication network. A cost criterion is associated with each determined path. This cost is determined according to information stored in the table 110, such as the information relating to the load of the distribution networks forming the path, information relating to the load of the peering devices between the distribution networks forming the path.

The cost may also take into account:
information relating to the costs of interconnection between the distribution networks;
information relating to the content itself, such as a type, a popularity, an origin, a cost, a throughput associated with the content of the content usage restriction rights;
information relating to a schedule;
information relating to a type of communication network underlying the distribution network.

This information list is obviously not exhaustive.

It is thus possible to optimize the quality of service by minimizing the latency time during the content distribution, to reduce the costs of interconnection between the underlying communication networks or to minimize a delivery resources cost.

In step E24, the second server 22 determines a path for which the overall cost assumes the lowest value. It is possible, for example, in order to determine the path, to use algorithms such as that of Dijkstra or the algorithm described in the patent application published under the number U.S. Pat. No. 7,257,628.

An ordered list of distribution networks thus forms the path obtained at the end of step E24, from the second distribution network to the distribution network requesting the ingestion of the content C. More precisely, it must be remembered that this ordered list or path corresponds to a list of devices or nodes belonging respectively to distribution networks and/or a list of devices or nodes in the underlying communication network.

In step E25, the second server 22 sends to the distribution network which transmitted the provision request to it an agreement for the provision of the content to the distribution network requesting the ingestion of the content, referred to below as the provision agreement or transfer agreement. The provision of the content corresponds to the transfer of the content to the distribution network having requested the content.

In step E31, the second server 22 determines the distribution network located immediately on the path to the distribution network requesting the content. The second server 22 then transmits the content C to this determined distribution network. More precisely, the content C is transmitted to the device of the determined distribution network device. In step E32, the second server 22 also transmits the path along which the content C must be routed. More precisely, the following information is associated with the content: an identifier of the content, an identifier of the source distribution network, an ordered list of the distribution networks via which the content passes, an identifier of the content, metadata, a duration of caching on the intermediate devices, a request to adapt the content to a given format, usage restriction rights, a popularity of the content. The content is, for example, identified in the manner described in the patent application published under the number U.S. 2007/0180468 A1 and entitled "Universal Digital Code For Unique Content Identification". The adaptation of the content to a given format can be implemented by the second server 22 or by a distribution network via which the content will pass. The popularity of the content allows intermediate distribution networks to store this content. In fact, it may be useful to an intermediate distribution network to store a popular content with a view to subsequent delivery to its own client entities.

In one alternative embodiment, the path is transmitted in association with the content C and steps E31 and E32 are thus combined.

The method then returns to step E1 on standby to detect an event.

In step E30, the second server 22 detects that it is receiving the content C and an associated path. The second server 22 then carries out steps E31 and E32, previously described, to retransmit the content C along the path to the distribution network requesting the content C.

The method then returns to step E1 on standby to detect an event.

In step E40, the second server 22 detects that it is receiving a provision agreement destined for the distribution network requesting the content.

In step E41, the second server 22 determines that it is not at the origin of the request for provision of the content C. In this case, in a step E42, the second server 22 transfers the provision agreement to the distribution network requesting the ingestion of the content C.

The method then returns to step E1 on standby to detect an event.

In parallel, in a step not shown, the second server 22 transmits the information relating to it to the other distribution networks with which a peering is established. In one particular embodiment, the second server 22 also relays the information relating to the other distribution networks received in step E10.

It should be noted that the provision request can be received directly from the distribution network requesting the content in the form of an ingestion request or can also be relayed by other distribution networks. It is possible to limit the number of times that the content provision request is relayed in order to limit the interactions with the distribution networks located in a fixed-size area. Moreover, loop avoidance mechanisms can be implemented.

It should also be noted that the provision agreement is transmitted on the reverse path of that taken by the provision request to the distribution network requesting the content. The content C for its part will take a minimum-cost path to the distribution network requesting the content ingestion, relayed, if necessary, by other distribution networks.

The implementation of the communication method will now be described in a particular example, in relation to FIG. 3.

Figure 3:
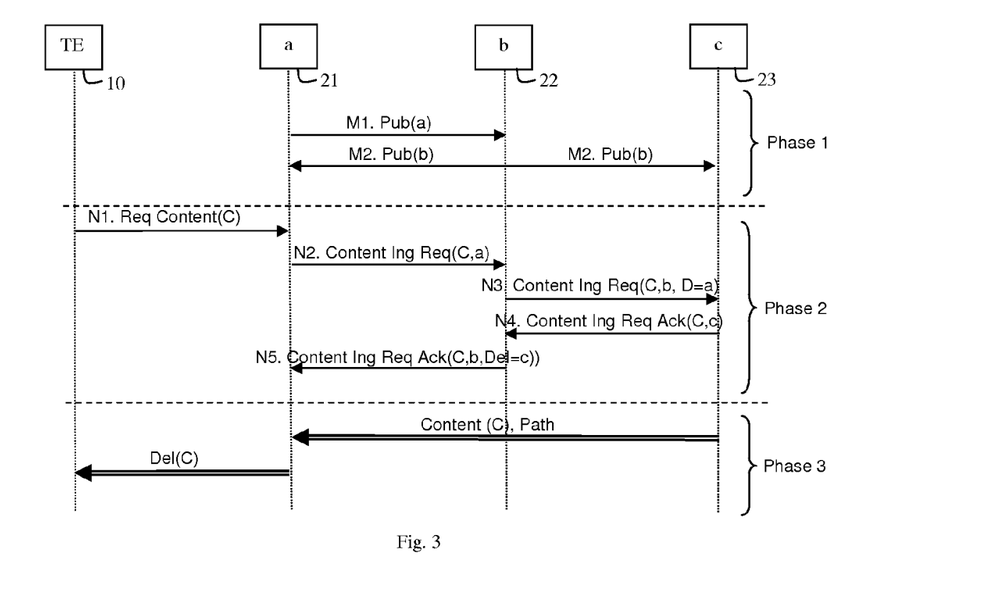
FIG. 3 shows an implementation of such a method in a digital content distribution system according to one embodiment of the present invention.

In this FIG. 3, the first server 21 is identified by a, the second server 22 by b, and the third server 23 by c.

A first phase, denoted Phase 1 in FIG. 3, corresponds to the exchanges of information between the distribution networks. Thus, if the second server 22 is considered, this server receives, in step E10, a message M1 transmitted by the first server 21, this message M1 comprising information relating to the first distribution network 31. Moreover, the second server 22 transmits to the first 21 and third 23 servers a message M2 comprising information relating to the second distribution network 32.

A second phase, denoted Phase 2 in FIG. 3, corresponds to the exchanges between different devices, corresponding to a search for a content C and to a preparation of the delivery for ingestion in the first distribution network 31. The client entity 10 transmits a message N1 requesting delivery of the content C to the first distribution network 31. The first server 21 is responsible for processing this delivery request. The case is then considered in which this content C is not available in the first 31 and second 32 distribution networks, but is available in the third distribution network 33. The first server 21 then transmits a request for ingestion of the content C to the second server 22 via the peering device 41 in the form of a message N2. This message N2 is received by the second server 22 in step E20. In step E21, the second server 22 detects that the content C is not available and transmits in step E22 a message N3 requesting provision of the content C to the third distribution network 33, with delegation by the second distribution network with a view to providing or transferring the content C to the first distribution network 31. The message N3 is received by the third server 23 in step E20. In step E21, the third server 23 determines that the content C is available. The third server 23 then determines in steps E23 and E24 an optimum path P to provide the content to the first distribution network 31 then, during step E25, sends to the second server 22 a message N4 comprising an agreement to provide the content C. This message N4 is received by the second server 22 during step E40 and is transferred in the form of a message N5 to the first server 21 during step E42. The message N4 is received by the first server 21 during step E40. The first server 21 being the requester of the content C, phase 2 ends.

A third phase, denoted Phase 3 in FIG. 3, corresponds to the phase of transfer or delivery of the content C to the first server 21 of the first distribution network 31, i.e. the phase of ingestion of the content C in the first distribution network. This delivery is carried out by means of the path P previously determined during the second phase. It must be remembered here that the path P does not necessarily take the path followed by the content provision request. By way of an illustrative example, the peering device 41 is congested and the costs of interconnection between the second 32 and fourth 34 distribution networks are high. In this example, the determined path P passes via the fourth distribution network 34 to reach the first distribution network 31. Once the content C has been taken in, it can be delivered to the client entity 10, if necessary via a content delivery server.

It is emphasized here that this particular example provides for the transmission by a client entity of a request for delivery of the content C. No limitation is imposed on this method of initiating the second phase. It is notably possible to provide that a distribution network requests the ingestion of a particular content according to its own specific criteria. By way of a non-limiting example, the distribution network may notably request the ingestion of a popular content.

Figure 4:
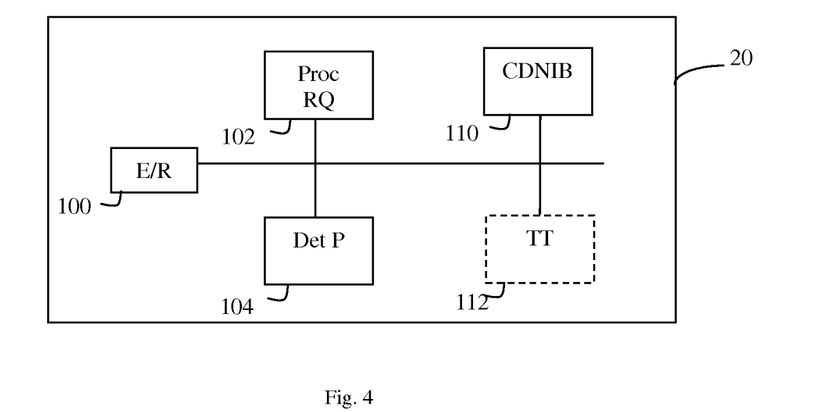
FIG. 4 shows an interfacing device of a content distribution network according to one embodiment of the invention.

An interfacing device 20, intended to be integrated into the first digital content distribution network, is shown in FIG. 4. The interfacing device is configured to interface with at least one other interfacing device of another content distribution network. In one particular embodiment, the interfacing device is integrated into the first server of the first content distribution network. This interfacing device 20 notably comprises:

the table 110 previously described;

a transmission/reception module 100, configured to communicate with other interfacing devices, notably to receive a content provision request transmitted by a device of a second content distribution network;

a content provision request processing module 102, configured to send a content provision request to at least one third content distribution network if the first distribution network is not able to respond to the request, a delegation by the first distribution network with a view to providing or transferring said content to the second distribution network being associated with said request.

In one particular embodiment, the interfacing device 20 furthermore comprises a path determination module 104, configured to determine a path linking the first distribution network to the second distribution network, if necessary via at least one fourth distribution network with which a peering is established. In this case, the transmission/reception module 100 is furthermore configured to transmit the content to the second distribution network on the path, if necessary via this or these other fourth distribution network(s).

In one particular embodiment, the interfacing device 20 furthermore comprises the topology table 112 previously described. In this case, the path determination module 104 uses the information from the topology table 112 in order to determine a path.

The modules 102, 104 are configured to carry out the method previously described. These modules are preferably software modules comprising software instructions to carry out the steps of the method previously described, implemented by the interfacing device. The invention therefore also relates to:

a program for an interfacing device, comprising program code instructions intended to control the performance of the steps of the method previously described, if said program is executed by said device;

a recording medium readable by an interfacing device on which the program for an interfacing device is recorded.

The software modules can be stored in or transmitted by a data medium. The latter may be a hardware storage medium, for example a CD-ROM, a magnetic diskette or hard disk, or a transmission medium such as an electrical, optical or radio signal, or a telecommunications network.

The invention also relates to a content distribution system, comprising at least two interfacing devices as previously described, each of the interfacing devices belonging to a content distribution network.

The description has been provided for a distribution network of a stand-alone system. It may also relate to a distribution network associated with a particular access network. In fact, a network operator may deploy, for example, one distribution network associated with fixed access and another distribution network associated with access via mobile communication networks. The description is readily transposable to this type of content distribution network architecture.

This content distribution network interconnection can be implemented via specific interfaces dedicated to the exchange of data relating to the content distribution networks, such as the routing of the content provision requests, content management, issue of delivery reports between networks for the delivery of content to client entities, or in the form of a mediation platform enabling the grouping of content distribution networks and the exchange of these same data without interfaces dedicated to the interconnection. The mediation platform centralizes the information relating to the distribution networks and is then responsible for the dialogue with the different distribution networks. In this respect, the mediation platform comprises an interfacing device 20 as previously described. The exchanges relating to the provision requests then pass via the mediation platform. However, the actual delivery of the content between the distribution networks can take place in this embodiment directly between the distribution networks in the manner previously described.

The method is also applicable to distribution networks in which the client entities themselves play the role of servers in the distribution network. In this case, the delivery of the content may notably involve such a client entity as the entry point of the distribution network or as a relay entity in the distribution network for the content delivery.

Although the present disclosure has been described with reference to one or more examples, workers skilled in the art will recognize that changes may be made in form and detail without departing from the scope of the disclosure and/or the appended claims.

The invention claimed is:

1. A method of communication implemented by an interfacing device of a server of a first content distribution network, said method comprising the following steps:
    receiving by the interfacing device a provision request corresponding to a content ingestion request transmitted by a device of a second content distribution network interconnected through a peering agreement with the first content distribution network, the content ingestion being a first storage of this content in the second content distribution network, with a view to storing the content in the second distribution network; and
    if said first content distribution network is not able to respond to the provision request, dispatching from the interfacing device the provision request and a piece of information relating to delegation by the first content distribution network to at least one third content distribution network, interconnected through a peering agreement with the first content distribution network but not interconnected through a peering agreement with the second content distribution network.

2. The method as claimed in claim 1, in which the provision request transmitted by the device of the second content distribution network is received via at least one fourth content distribution network.

3. The method as claimed in claim 1, furthermore comprising:
    receiving an agreement to transfer the content from the third distribution network; and
    dispatching said agreement to the second distribution network.

4. The method as claimed in claim 1, furthermore comprising, if said first distribution network is able to respond to the request:
    determining a path linking the first distribution network to the second distribution network, if necessary via at least one fourth distribution network with which a peering is established; and
    dispatching content to the second distribution network on said path, if necessary via said at least one fourth distribution network.

5. The method as claimed in claim 4, furthermore comprising receiving information relating to said at least one fourth distribution network and in which said information is taken into account in order to determine the path.

6. The method as claimed in claim 1, furthermore comprising:
    receiving said content and the associated path from the third distribution network to the second distribution network; and
    dispatching the content to the second distribution network on said path via one of the distribution networks located on said path and with which a peering is established.

7. The method as claimed in claim 1, wherein the piece of information on delegation informs the third content distribution network that the third content distribution network is a delegate of the second content distribution network having relayed the provision request.

8. An interfacing device intended to be integrated into a first content distribution network, configured to interface with at least one second interfacing device of a second content distribution network, said device comprising:
    a program execution device;
    a non-transitory computer-readable medium comprising program code instructions stored thereon, which when executed by the program execution device configure the program execution device to perform acts of:
        receiving a provision request corresponding to a content ingestion request transmitted by a device of a second content distribution network interconnected through a peering agreement with the first content distribution network, the content ingestion being a first storage of this content in the second content distribution network, with a view to storing the content in the second distribution network; and
        dispatching the provision request and a piece of information relating to delegation by the first content distribution network to at least one third content distribution network interconnected through a peering agreement with the first content distribution network but not interconnected through a peering agreement with the second content distribution network, if said first content distribution network is not able to respond to the provision request.

9. The interfacing device as claimed in claim 8, wherein the program code instructions further configured the program execution device to perform acts of:
    determining a path, linking the first distribution network to the second distribution network, if necessary via at least one fourth distribution network with which a peering is established; and
    dispatching the content to the second distribution network on said path, if necessary via said at least one fourth distribution network.

10. A server of a content distribution network comprising at least one interfacing device as claimed in claim 8.

11. A content distribution system comprising at least two interfacing devices as claimed in claim 8, belonging respectively to two digital content distribution networks.

12. A non-transitory storage medium readable by an interface device of a content distribution network and comprising a program recorded thereon, the program comprising program code instructions configured to control performance of a method of communication implemented by an interfacing device of a server of a first network for distributing digital contents when said program is executed by said interfacing device, wherein the method comprises:

receiving by the interfacing device a provision request corresponding to a content ingestion request transmitted by a device of a second content distribution network interconnected through a peering agreement with the first content distribution network, the content ingestion being a first storage of this content in the second content distribution network, with a view to storing the content in the second content distribution network; and     if said first content distribution network is not able to respond to the provision request, dispatching from the interfacing device the provision request and a piece of information relating to delegation by the first content distribution network to at least one third content distribution network interconnected through a peering agreement with the first content distribution network but not interconnected through a peering agreement with the second content distribution network.

\* \* \* \* \*

UNITED STATES PATENT AND TRADEMARK OFFICE
CERTIFICATE OF CORRECTION

PATENT NO. : 9,560,135 B2  
APPLICATION NO. : 14/110662  
DATED : January 31, 2017  
INVENTOR(S) : Thang Vu Duong et al.

Page 1 of 1

It is certified that error appears in the above-identified patent and that said Letters Patent is hereby corrected as shown below:

In the Claims

Claim 9, Column 12, Line 61, "determining a path, linking the" should read --determining a path linking the--.

Signed and Sealed this
Eighth Day of May, 2018

Andrei Iancu
*Director of the United States Patent and Trademark Office*